Jan. 16, 1968 G. A. BOYD 3,363,651
ROTARY FLUID VALVE
Filed Feb. 26, 1965 3 Sheets-Sheet 1
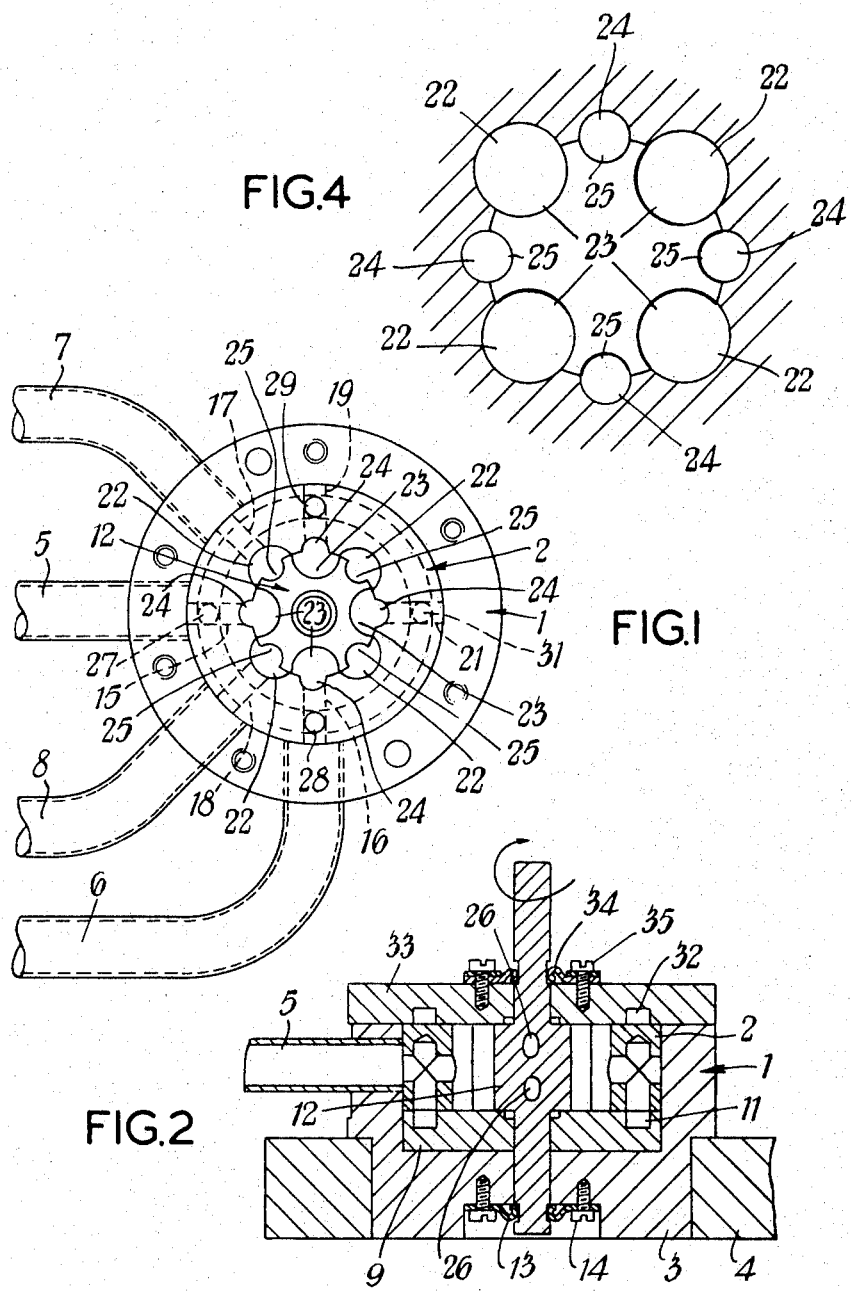

United States Patent Office 3,363,651
Patented Jan. 16, 1968

3,363,651
ROTARY FLUID VALVE
Gordon Andrew Boyd, Dorset, England, assignor to Vickers-Armstrongs (Engineers) Limited, London, England, a British company
Filed Feb. 26, 1965, Ser. No. 435,467
Claims priority, application Great Britain, Feb. 27, 1964, 8,282/64
6 Claims. (Cl. 137—625.23)

ABSTRACT OF THE DISCLOSURE

A rotary fluid valve having a cylindrical rotary valve member disposed in a complementary chamber defined by a valve body in which recesses are formed in the inner wall of the chamber complementary to a recess formed in the rotary valve member. The recesses in the wall of the chamber merge with outlet ports and the recesses are spaced so that the rotary valve member can be angularly displaced to provide through its recess a fluid path from a main inlet to one or other of the outlet ports.

Cross-reference to related application

This application corresponds to British application No. 8,282/64, filed Feb. 27, 1964, the priority of which is claimed.

Summary of the invention

This invention relates to fluid valves and is concerned with the provision of a generally improved rotary fluid valve. The invention is also concerned with the simplification of the manufacture of such valves.

According to the present invention, there is provided a rotary fluid valve including a valve body which defines a valve chamber having two recesses in the chamber wall which respectively merge with first and second valve ports, and a rotary valve member housed in said chamber and having a peripheral recess which is arranged, in a first angular position of the valve member, to provide a connection between one of the ports and a third port lying between the first mentioned ports, connection between the other first mentioned port and the third port being interrupted and, in a second angular position of said valve member, to provide a connection with said other port and the third port, connection between the latter port and said one port being interrupted.

Brief description of the drawings

In order that the invention may be more fully understood, one construction of valve, in accordance with the invention, will now be described, by way of example, with reference to the accompanying drawings in which, FIGURE 1 shows a plan view of the valve with a cover of the valve removed, FIGURE 2 shows an axial section through the valve, FIGURE 4 illustrates diagrammatically a step taken during manufacture of the valve.

Description of preferred embodiments

Figure 3A:
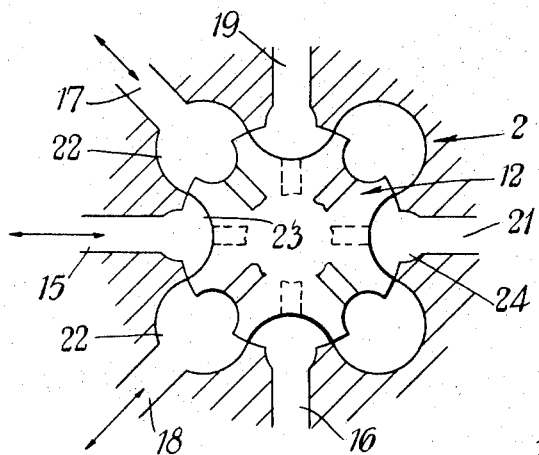
FIGURES 3A to 3C show diagrammatically the valve member or rotor of the valve in various operative positions in relation to a surrounding body.

Referring now to FIGURES 1 and 2, the valve includes a generally cylindrical casing 1 which is bored at one end to receive a valve body 2 which is in the form of an insert as will be described in more detail later. At the other end, the casing is turned down to form a spigot 3 which engages in a hole provided in a main valve supporting plate 4.

The wall of the casing surrounding the bore is radially drilled at a location approximately half-way along the length of this wall to receive a valve inlet pipe 5 connectible, for example, to a fluid supply pump. The wall is also drilled at a location 90° displaced from the inlet pipe to receive a return pipe 6 which is connectible, for example, to a fluid reservoir tank. At two further locations the wall is drilled to receive outlet pipes 7 and 8 which are respectively connectible to hydraulic apparatus, for example hydraulic jacks. As will be seen from FIGURE 1, the outlet pipes lie on opposite sides respectively of the inlet pipe and each subtends an angle of 45° with the latter.

As shown in the drawings, the valve body is in the form of an annular insert dimensioned closely to fit in the bore in the casing and an end plate 9, which forms an end wall for the body, is positioned between the end wall of the casing and the body, the plate being provided, for a purpose to be described later, with an annular recess 11. The valve body 2 defines a valve chamber which houses a rotary valve member or rotor 12. This is generally cylindrical in shape being of a diameter to suit the internal diameter of the chamber and has a shaft projecting from the centre of each end face of the rotor. On positioning of the rotor in the body the lower of these shafts projects through registering holes in the end cap and casing into a recess formed in the spigotted end of the casing which houses a moulded rubber sealing diaphragm 13 secured by screws 14 to the casing 1.

To provide a fluid connection between the various pipes and the valve chamber, the valve body is provided with four radial ports 15–18 which respectively align with the four fluid pipes 5–8. The body is provided with two further radial ports 19, 21, the port 19 being diametrically opposite the port 16 and the port 21 being diametrically opposite the inlet port 15. In order to provide for selective connection of the port 15 with the outlet ports 17 and 18 and of the outlet ports with the return port 16 in a manner which will become apparent later, the body and rotor are each provided with four part-circular recesses which are referenced 22 for the body and 23 for the rotor. To facilitate flow of fluid through the valve as will be explained later, four further recesses 24 are machined in the body and four further recesses 25 in the rotor.

The rotor is also provided with two cross-drillings 26 (FIG. 2) one of which interconnects two diametrically opposed recesses 25 and the other of which interconnects the remaining recesses 25 in the rotor. Furthermore the valve body has four axial drillings 27–31 of which the drillings 27 and 31 respectively connect the ports 15 and 21 with the recess 11 in the end plate 9 and of which the drillings 28 and 29 similarly connect the ports 16 and 19 with an annular recess 32 in a cover plate 33. Thus the port 21 is connected to the port 15 and the port 19 is connected to the port 16. The cover plate 33, which is apertured to receive the upper shaft from the rotor, is mounted on the end of the casing to hold the rotor and valve body in place. The cover plate which thus forms an end wall for the body, is provided with a moulded rubber sealing diaphragm 34 which is of similar construction as the aforesaid diaphragm 13 and has similar securing screws 35. The projecting rotor shaft end provides means for controlling the angular position of the rotor and hence the state of the valve.

The method of forming the recesses in the valve body and in the rotor during manufacture of the valve, which method is of particular significance, will now be described with reference to FIGURE 4.

Firstly the rotor, which is in the form of a blank and which is a press-fit in a body blank, is pressed into the body blank and clamped in this position. Secondly four equally spaced holes of a predetermined diameter and pitch circle diameter are machined in the assembly of rotor and body, each hole being composed of a part-circular recess 22 in the body and a complementary part-circular recess 23 in the rotor. The holes may be formed by drilling and reaming or boring.

Four further holes, of smaller diameter than the above holes, are now formed in the same manner, to provide the additional recesses 24 and 25 in the body and in rotor respectively. The rotor and body are now separated and the proper radial clearance machined between them.

In use of the valve, the rotor is positioned as illustrated in FIGURE 1 and here it should be explained that the diameter and pitch circle diameter of the holes which were drilled to form the recesses 22 and 23 are so chosen that the wall of each recess 23 extends exactly to the walls of the two adjacent recesses 22 in the body such that the slightest displacement of the rotor in one direction will cause the recess 23 to provide a connection between the port 15 and one of the ports 17, 18 depending, of course, upon the direction of rotor displacement.

The position of the rotor shown in FIGURE 1 corresponds to the closed condition of the valve, which is also illustrated in FIGURE 3A and in which fluid is prevented from flowing from the inlet port 15 directly to either of the outlet ports 17 or 18. Although, as will be remembered, fluid can flow from the port 15 to the port 21, the rotor similarly prevents fluid from flowing into the recesses 22 adjacent to the port 21.

Likewise connection between the return port 16 and the outlet port 18 is interrupted and so also is connected between the port 16 and the recess 22 to the right thereof in the drawings which recess is connected by one of the cross-drillings 26 to the outlet port 17. If, as suggested above, the inlet port is connected to a fluid pump, the return port of a reservoir and the outlet ports to hydraulic jacks respectively, then, in the closed condition of the valve, the jacks will be isolated from both the pump and the reservoir.

Figure 3B:
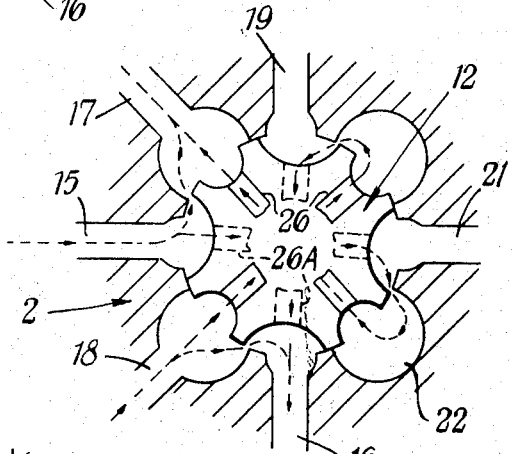

If now the rotor is angularly displaced in one direction, as is illustrated in FIGURE 3B, fluid can flow from the inlet port 15 to the outlet port 17 directly, direct connection between the inlet port and other outlet port 18 being interrupted. A second fluid path from the inlet port 15 to the outlet port 17 is provided partly by the connection of the port 21 with the port 15 (indicated as 26A in the drawings). A third fluid path is also provided by the connection of the ports 15 with the port 21 through the axial drillings 27 and 31 (not shown) and the recess 11 (not shown). From the port 21 fluid flows into the now uncovered recess 22 adjacent to the port 21 and through the particular cross-drilling 26 to the port 17. Therefore one of the jacks is charged with fluid. As far as the other jack is concerned, the respective outlet port 18 is in direct connection with the return port 16, and, a second fluid path to the port 16 is provided by the associated cross-drilling 26 from which fluid can flow into the port 19, the path being completed by the connection of the port 19 with the port 16 which is also indicated by the reference numeral 26A. A third fluid path is also provided by the connection of the ports 16 and 19 through the axial drillings 28 and 29 (not shown) and the recess 32 (not shown).

It will thus be seen that the cross drillings 26, the axial drillings 27–31 and the recesses 11 and 32 provide the valve with double porting. They also achieve static balancing. The recesses 24 and 25 in the rotor and body serve to offer a suitable flow path to the ported fluid and provided a measure of flow force reduction. They also serve to reduce mechanical friction by reduction of rubbing surfaces.

Figure 3C:
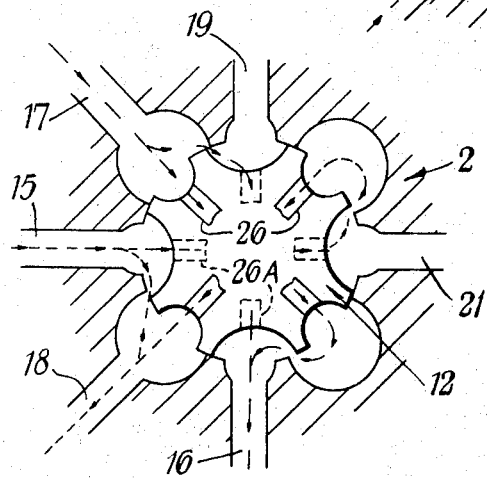

Movement of the rotor in the other direction (illustrated in FIGURE 3C) merely serves to exhaust the previously charged jack and to charge the previously exhausted jack.

Figure 5A:
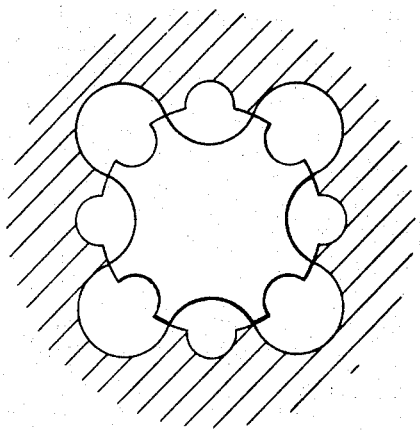
FIGURES 5A to 5C show diagrammatically the effect of varying the size of certain recesses in the valve member and surrounding body.
Figure 5B:
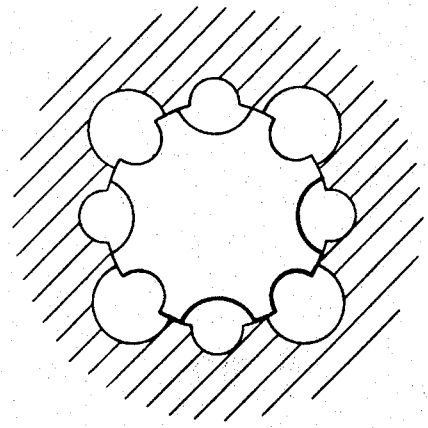

The particular valve described has zero lap in that movement of the rotor from the closed position immediately supplies one of the two jacks and exhausts the other. If, for the same pitch circle diameter of the larger holes machined in the rotor and body, that is, the holes forming the recesses 22 and 23, the diameter of each hole had been smaller, the rotor would then have had idle movement about a central OFF position during which the valve would still be closed. This is referred to as over lap and is illustrated in FIGURE 5B (FIGURE 5A illustrating zero lap).

Figure 5C:
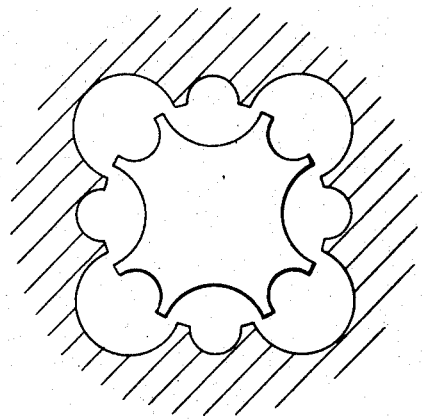

Likewise increase in the diameter of the holes, for the same pitch circle diameter, above the necessary to give zero lap, results in the valve always providing a connection between the supply and both jacks and between the jacks and the reservoir in the position of the rotor corresponding to the previously OFF position. However movement of the rotor in one direction or the other provides for a greater flow of fluid to the jack concerned and interrupts connection between the supply and the other jack which is now exhausted, connection between the first jack and the reservoir being interrupted. This is referred to as under lap and is illustrated in FIGURE 5C. The desired valve lap can also be obtained by controlling the pitch circle diameter of the holes concerned in relation to the diameter of these holes. It will therefore be seen that the desired valve lap can be readily obtained and, furthermore, the construction of the valve and its manufacture provides for controlled predetermined accuracies thus avoiding the usual process of adjusting land lengths after manufacture to achieve accuracies.

I claim:

1. A rotary fluid valve including a valve body (2) which defines a valve chamber, first and second valve ports (17 and 18) leading into said valve chamber, and a third valve port (15), disposed between said first and second valve ports and also leading into said chamber; and a rotary valve member (12) housed in said valve chamber and having a peripheral recess (23), said rotary valve member being angularly displaceable into first and second positions in which its peripheral recess connects the third port with the first and second ports respectively, wherein the improvement comprises two recesses (22) formed in said valve body which respectively merge with said first and second valve ports and which are each complementary in shape to said peripheral recess.

2. A valve as claimed in claim 1, in which said valve body incorporates a fourth port (16) which is separated from the third port by said first and second ports respectively and said rotary valve member has a second peripheral recess which is of the same shape and size as the first mentioned peripheral recess and which, in one of said angular positions of the valve member, connects the second and fourth ports (18 and 16), said valve further including means incorporating said second peripheral recess for connecting the first and fourth ports (17 and 16) in the other position of said valve member.

3. A valve as claimed in claim 2, in which said valve body incorporates two further recesses (22) which are of the same shape and size as the first mentioned recesses (22), and which both lie between the fourth port (16) and one of said first mentioned ports and which together with said first mentioned recesses (22) are equally spaced about the axis of the rotary valve member, and the rotary valve member has two further peripheral recesses (23) which are of the same shape and size as the first and second peripheral recesses and which together with the first and second peripheral recesses (23) are also equally spaced about the axis of the rotary valve member, in which said valve body incorporates fifth and sixth, subsidiary, ports (21 and 16) which are respectively opposite to said third and fourth ports and which are respectively connected through the valve body to said third and fourth ports, the third, fourth, fifth and sixth ports interspacing the four recesses (22) in the valve body and, together with said four recesses in the valve body, being equally spaced about the axis of the rotary valve member, and in which the rotary valve member has two axially spaced cross-drillings (26) respectively to connect the first and second recesses in the valve body with the recess which is opposite in each case, the disposition of the further recesses and further ports being such that in each of said positions of the rotary valve member, one of said further peripheral recesses, in conjunction with one or other of the recesses in the valve body adjacent thereto forms part of a second fluid path connecting the third port (15) with that of said first mentioned ports (17 and 18) which is connected by said first peripheral recess (23) to said third port (15), and the other of said further peripheral recesses (23) in conjunction with one or other of the two recesses in the body adjacent thereto, forms part of a second fluid path connecting the fourth port (16) with that of said first and second ports (17 and 18) which is connected by the second peripheral recess to said fourth port (16).

4. A valve as claimed in claim 3, in which said third, fourth, fifth and sixth ports respectively open through additional recesses (24) in the chamber wall which are all of the same shape and size and the rotary valve member has four additional recesses (25) which are complementary in shape to the additional recesses on the valve body and through which the cross drillings (26) open.

5. A valve as claimed in claim 4, in which the valve body comprises an open ended cylindrical member and two end walls closing the respective ends of the cylindrical member, one said end wall having an annular recess (11) formed therein, and the valve body incorporates two axial drillings (27 and 31) which respectively extend from the third and fifth ports to said annular recess (11) to connect said third and fifth ports.

6. A valve as claimed in claim 5, in which the other end wall has an annular recess (32) therein and the valve body incorporates two further axial drillings (28 and 29) which respectively extend from the fourth and sixth ports to said second mentioned annular recess to connect said fourth and sixth ports.

References Cited

UNITED STATES PATENTS

| | | | |
|---|---|---|---|
| 2,182,459 | 12/1939 | Vickers | 137—625.43 X |
| 2,749,941 | 6/1956 | Garden | 251—283 X |
| 2,907,349 | 10/1959 | White | 251—283 X |
| 3,145,626 | 8/1964 | Vickers et al. | 137—625.24 X |
| 3,269,940 | 1/1967 | Eddy et al. | 137—625.24 X |

M. CARY NELSON, *Primary Examiner.*

A. ROSENTHAL, *Assistant Examiner.*